(12) United States Patent
Gordon et al.

(10) Patent No.: US 9,475,998 B2
(45) Date of Patent: *Oct. 25, 2016

(54) PROCESS FOR RECOVERING ALKALI METALS AND SULFUR FROM ALKALI METAL SULFIDES AND POLYSULFIDES

(71) Applicant: Ceramatec, Inc., Salt Lake City, UT (US)

(72) Inventors: John Howard Gordon, Salt Lake City, UT (US); Javier Alvare, Cottonwood Heights, UT (US)

(73) Assignee: CERAMATEC, INC., Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/210,891

(22) Filed: Mar. 14, 2014

(65) Prior Publication Data

US 2014/0197040 A1 Jul. 17, 2014

Related U.S. Application Data

(63) Continuation-in-part of application No. 12/576,977, filed on Oct. 9, 2009, now Pat. No. 8,728,295.

(60) Provisional application No. 61/781,557, filed on Mar. 14, 2013, provisional application No. 61/103,973, filed on Oct. 9, 2008.

(51) Int. Cl.
 *C25C 1/02* (2006.01)
 *C25B 1/00* (2006.01)
 (Continued)

(52) U.S. Cl.
 CPC .............. *C10G 32/02* (2013.01); *C25B 1/00* (2013.01); *C25C 1/02* (2013.01); *C25C 3/02* (2013.01); *C25C 7/06* (2013.01)

(58) Field of Classification Search
 CPC ............ C25C 3/02; C25C 7/04; C25C 1/02; C25C 7/06; C10G 32/02; C25B 1/00
 See application file for complete search history.

(56) References Cited

U.S. PATENT DOCUMENTS

| 1,501,756 A | 7/1924 | Downs |
| 2,772,211 A | 11/1956 | Hawkes et al. |

(Continued)

FOREIGN PATENT DOCUMENTS

| DE | 2558505 | 11/1976 |
| GB | 2170220 | 7/1986 |

(Continued)

OTHER PUBLICATIONS

Reggel, et al., "Desulphurization of Gasoline by Metallic Sodium", *Fuel*, vol. 55, (Jul. 1976),170-172.

(Continued)

*Primary Examiner* — Ciel Thomas
(74) *Attorney, Agent, or Firm* — Paul S. Cha

(57) ABSTRACT

Alkali metals and sulfur may be recovered from alkali monosulfide and polysulfides in an electrolytic process that utilizes an electrolytic cell having an alkali ion conductive membrane. An anolyte solution includes an alkali monosulfide, an alkali polysulfide, or a mixture thereof and a solvent that dissolves elemental sulfur. A catholyte includes molten alkali metal. Applying an electric current oxidizes sulfide and polysulfide in the anolyte compartment, causes alkali metal ions to pass through the alkali ion conductive membrane to the catholyte compartment, and reduces the alkali metal ions in the catholyte compartment. Liquid sulfur separates from the anolyte solution and may be recovered. The electrolytic cell is operated at a temperature where the formed alkali metal and sulfur are molten.

7 Claims, 4 Drawing Sheets

(51) Int. Cl.
  *C10G 32/02* (2006.01)
  *C25C 7/06* (2006.01)
  *C25C 3/02* (2006.01)

(56) References Cited

U.S. PATENT DOCUMENTS

| | | | |
|---|---|---|---|
| 2,836,633 | A | 5/1958 | Esmay et al. |
| 3,284,325 | A | 11/1966 | Gibson et al. |
| 3,497,569 | A | 2/1970 | Stiles |
| 3,785,965 | A | 1/1974 | Welty |
| 3,787,315 | A | 1/1974 | Bearden, Jr. et al. |
| 3,788,978 | A | 1/1974 | Bearden, Jr. et al. |
| 3,791,966 | A | 2/1974 | Bearden |
| 3,960,708 | A | 6/1976 | McCollum et al. |
| 4,003,823 | A | 1/1977 | Baird et al. |
| 4,076,613 | A | 2/1978 | Bearden, Jr. |
| 4,225,417 | A | 9/1980 | Nelson |
| 4,320,180 | A | 3/1982 | Nozaki |
| 4,428,828 | A | 1/1984 | Bose |
| 4,454,017 | A | 6/1984 | Swanson |
| 4,500,414 | A | 2/1985 | Audeh |
| 4,501,652 | A | 2/1985 | Le et al. |
| 4,544,461 | A * | 10/1985 | Venkatesan et al. ......... 204/265 |
| 4,548,702 | A | 10/1985 | York et al. |
| 4,606,812 | A | 8/1986 | Swanson |
| 5,057,194 | A | 10/1991 | Stewart et al. |
| 5,328,577 | A | 7/1994 | Murphy |
| 5,695,632 | A | 12/1997 | Brons et al. |
| 5,750,814 | A | 5/1998 | Grootjans et al. |
| 5,935,419 | A | 8/1999 | Khan et al. |
| 5,935,421 | A | 8/1999 | Brons et al. |
| 6,022,494 | A | 2/2000 | Sartori et al. |
| 6,132,590 | A | 10/2000 | Moran et al. |
| 6,210,564 | B1 | 4/2001 | Brons et al. |
| 6,280,128 | B1 | 8/2001 | Schrader |
| 6,368,486 | B1 | 4/2002 | Thompson et al. |
| 6,413,898 | B1 | 7/2002 | Faber et al. |
| 6,534,668 | B2 | 3/2003 | Backer et al. |
| 6,635,795 | B2 | 10/2003 | Gislason et al. |
| 6,679,987 | B1 | 1/2004 | Blum et al. |
| 6,706,902 | B2 | 3/2004 | Sturmann et al. |
| 6,734,133 | B1 | 5/2004 | Weisbeck et al. |
| 6,770,187 | B1 | 8/2004 | Putter et al. |
| 6,787,019 | B2 | 9/2004 | Jacobson et al. |
| 6,939,941 | B2 | 9/2005 | Gilmore et al. |
| 7,255,961 | B2 * | 8/2007 | Schucker ................ 429/129 |
| 7,504,023 | B2 | 3/2009 | Pravia et al. |
| 7,897,028 | B2 | 3/2011 | Gordon et al. |
| 8,088,270 | B2 | 1/2012 | Gordon et al. |
| 8,871,951 | B2 | 10/2014 | Al-Shafei |
| 2002/0011430 | A1 | 1/2002 | Greaney |
| 2002/0045101 | A1 * | 4/2002 | Hwang et al. ................ 429/324 |
| 2002/0125175 | A1 | 9/2002 | Collins et al. |
| 2003/0103884 | A1 | 6/2003 | Lynn |
| 2005/0145545 | A1 | 7/2005 | Schucker |
| 2005/0161340 | A1 | 7/2005 | Gordon et al. |
| 2006/0054538 | A1 | 3/2006 | Hsu et al. |
| 2006/0138029 | A1 | 6/2006 | Malek et al. |
| 2006/0169590 | A1 | 8/2006 | Hebditch et al. |
| 2007/0087934 | A1 | 4/2007 | Martens et al. |
| 2008/0031792 | A1 | 2/2008 | Ciccarelli et al. |
| 2008/0251422 | A1 | 10/2008 | Baez et al. |
| 2009/0134040 | A1 | 5/2009 | Gordon et al. |
| 2009/0259082 | A1 | 10/2009 | Deluga et al. |
| 2010/0089762 | A1 | 4/2010 | Gordon |
| 2010/0155298 | A1 | 6/2010 | Raterman et al. |
| 2010/0187124 | A1 | 7/2010 | Koveal |
| 2010/0276335 | A1 | 11/2010 | Schucker |
| 2010/0297531 | A1 | 11/2010 | Liu et al. |
| 2010/0297537 | A1 | 11/2010 | Coors et al. |
| 2010/0304953 | A1 | 12/2010 | Liu et al. |
| 2011/0054232 | A1 | 3/2011 | Sangar et al. |
| 2011/0100874 | A1 | 5/2011 | Gordon |
| 2011/0119994 | A1 | 5/2011 | Hogendoorn et al. |
| 2011/0155647 | A1 | 6/2011 | Serban et al. |
| 2012/0304530 | A1 | 12/2012 | Chitta et al. |
| 2013/0043160 | A1 | 2/2013 | Gordon |
| 2013/0140217 | A1 | 6/2013 | Gordon et al. |
| 2013/0153469 | A1 | 6/2013 | Gordon |

FOREIGN PATENT DOCUMENTS

| | | |
|---|---|---|
| KR | 2006-0032194 | 4/2006 |
| WO | WO02099013 | 12/2002 |
| WO | WO-02099013 | 12/2002 |
| WO | WO2010016899 | 1/2010 |
| WO | WO-2010124030 | 10/2010 |
| WO | WO-2011012900 | 2/2011 |
| WO | WO2011053919 | 5/2011 |
| WO | WO2011053919 | 9/2011 |
| WO | WO2013019596 | 2/2013 |
| WO | WO2012147097 | 3/2013 |

OTHER PUBLICATIONS

Byun, Sang H., "International Search Report", International Search Report for PCT US 2010/054984 (Corresponding to U.S. Appl. No. 12/916,984), (Jul. 28, 2011),1-3.

Byun, Sang H., "Written Opinion of the International Searching Authority", Written Opinion for PCT US 2010/054984 (Corresponding to U.S. Appl. No. 12/916,984), (Jul. 28, 2011),1-5.

Kabe, T. et al., "Hydrodesulfurization and Hydrodenitrogenation", *Wiley-VCH (1999)*, (1999),110-112.

Task Force on Strat. UNCNV. Fuel, "America's Strategic Unconventional Fuels, vol. III Resource and Technology Profiles", *America's Strategic Unconventional Fuels*, vol. III *Resource and Technology Profiles* (completed Feb. 2007, Published Sep. 2007)., Full text available at http://www.unconventionalfuels.org/publications/reports/Volume_III_ResourceTechProfiles(Final).pdf,(Sep. 2007),III-25.

Lee, Young W., "International Search Report", PCT/US/2012/039388 (corresponding to U.S. Appl. No. 12/916,948), (Dec. 27, 2012),1-3.

Lee, Young W., "Written Opinion of the International Searching Authority", PCT/US/2012/039388 (corresponding to U.S. Appl. No. 12/916,948), (Dec. 27, 2012),1-3.

Yu, Jianfei et al., "High temperature naphthenic acid corrosion of steel in high Tan refining media", *Anti-Corrosion Methods and Materials*, vol. 55 Issue 5, (2008),257-63.

Wang, Chen et al., "High Temperature Naphthenic Acid Corrosion of Typical Steels", *Canadian Journal on Mechanical Sciences and Engineering* vol. 2, No, 2 (Feb. 1, 2011),23-30.

Seo, Sang Y., "International Search Report", PCT App. No. PCT/US2012/046939 (Corresponding to U.S. Appl. No. 13/550,313), (Jan. 31, 2013),1-3.

Seo, Sang Y., "Written Opinion of the International Searching Authority", PCT App. No. PCT/US2012/046939 (Corresponding to U.S. Appl. No. 13/550,313), (Jan. 31, 2013),1-6.

Hwang, Yun K., "International Search Report", PCT App. No. PCT/US2012/065670 (corresponding to U.S. Appl. No. 13/679,696), (Apr. 1, 2013),1-4.

Hwang, Yun K., "Written Opinion of the International Searching Authority", PCT App. No. PCT/US2012/065670 (corresponding to U.S. Appl. No. 13/679,696), (Apr. 1, 2013),1-8.

Valencia, Juan C., "Non-Final Office Action", U.S. Appl. No. 12/916,984, (Mar. 25, 2013),1-10.

Bentor, Yinon "Chemical Element.com—Sodium", http://www.chemicalelement.com/elements/na.html, (1996),1-3.

Lee, Dong W., "International Search Report", PCT/US2013/023850 (Corresponding to U.S. Appl. No. 13/753,918), (May 14, 2013),1-3.

Lee, Dong W., "Written Opinion of the International Searching Authority", PCT/US2013/023850 (Corresponding to U.S. Appl. No. 13/753,918), (May 14, 2013),1-5.

Wood, Elizabeth D., "Non-Final Office Action", U.S. Appl. No. 13/0497057, (Jul. 15, 2013),1-7.

"Natural Gas", http://www.gasenergia.com.br/portal/ing/gasnatural/dadostecnicos.jsp, (Jun. 10, 2004),1-20.

(56) References Cited

OTHER PUBLICATIONS

Sternberg, et al., "Solubilization of Coal via Reductive Alkylation", *Preprints of Papers—American Chemical Society, Division of Fuel Chemistry* (1970), 14(1), 87-94 (available to the public 1984) CODEN: ACFPAI, ISSN: 0569-3772, (1970),87-94.
Valencia, Juan C., "Non-Final Office Action", U.S. Appl. No. 12/916,984, (Sep. 10, 2013),1-10.
Valencia, Juan C., "Non Final Office Action", U.S. Appl. No. 13/550,313, (Sep. 10, 2013),1-12.
Lee, Dong W., "International Search Report", PCT Application No. PCT/US1350194 (Corresponding to U.S. Appl. No. 13/940,336), (Nov. 5, 2013),1-5.
Lee, Dong W., "Written Opinion of the International Searching Authority", PCT Application No. PCT/US1350194 (Corresponding to U.S. Appl. No. 13/940,336), (Nov. 5, 2013),1-5.
Lee, Dong W., "International Search Report", PCT Application No. PCT/US2013/026698 (Corresponding to U.S. Appl. No. 13/770,610), (Aug. 19, 2013),1-5.
Lee, Dong W., "Written Opinion of the International Searching Authority", PCT Application No. PCT/US2013/026698 (Corresponding to U.S. Appl. No.13/770,610), (Aug. 19, 2013),1-5.
Valencia, Juan C., "Notice of Allowance", U.S. Appl. No. 13/753,918, (Nov. 20, 2013),1-18.
"Non Final Office Action", Chinese Application No. 201080049770.5, (Dec. 4, 2013),1-18.
Valencia, Juan C., "Notice of Allowance", U.S. Appl. No. 12/916,984, (May 7, 2014),1-9.
Valencia, Juan C., "Notice of Allowance", U.S. Appl. No. 13/550,313, (May 8, 2014),1-8.
Oh, Eung G., "International Search Report", PCT Application No. PCT/US2014/034183 (Corresponding to U.S. Appl. No. 14/253,286), (Aug. 11, 2014),1-3.
Oh, Eung G., "Written Opinion of the International Searching Authority", PCT Application No. PCT/US2014/034183 (Corresponding to U.S. Appl. No. 14/253,286), (Aug. 11, 2014),1-6.
Lee, Chang H., "International Search Report", PCT Application No. PCT/US2014/027292 (Corresponding to U.S. Appl. No. 14/210,891), (Jul. 8, 2014),1-3.
Lee, Chang H., "Written Opinion of the International Search Authority", PCT Application No. PCT/US2014/027292 (Corresponding to U.S. Appl. No. 14/210,891), (Jul. 8, 2014),1-5.
Aizawa, Keisuke "Non-Final Office Action", Japanese Application No. 2012537170, (Aug. 26, 2014),1-6.
Lachman, Richard "Supplementary European Search Report", (Nov. 11, 2014),1-7.
"Non Final Office Action", Chinese Application No. 201080049770.5, (Jul. 1, 2014),1-4.
"Notice on Grant of Patent Right for Invention", Chinese Patent Application No. 201080049770.5, (Oct. 10, 2014),1-4.
Bearden, et al., "Bibliographic data", German Patent Publication DE2558505, (Nov. 18, 1976),1.
Francis, Humblot "Bibliographic data and English Abstract", Korean Patent Publication KR20060032194, (Apr. 14, 2006),1.
Bearden, "Bibliographic Data", German Patent Publication DE2558505, (Nov. 18, 1976),1.
Mueller, Derek N., "Non-Final Office Action", U.S. Appl. No. 13/770,610, (Jan. 21, 2015),1-6.
Seifert, W K., "Carboxylic Acids in Petroleum and Sediments", *Fortschr Chem Org Naturst*, (Jan. 1, 1975),1-49.
Lopez, Jose Luis S., "Non-Final Office Action", Colombia Patent Application No. 15-094.730, (May 16, 2015),1-6.
"Singapore Search Report", Singapore Patent Application No. 11201402307S, (Apr. 24, 2015),1-8.
"Singapore Written Opinion", Singapore Patent Application No. 11201402307S, (Apr. 24, 2015),1-11.
Menard, Randall "Canadian Search Report", Canada Patent Application No. 2705270, (May 20, 2015),1-4.
Valencia, Juan C., "Non-Final Office Action", U.S. Appl. No. 13/679,696, (Jul. 14, 2015),1-9.
Robinson, Renee E., "Non-Final Office Action", U.S. Appl. No. 13/940,336, (Jun. 11, 2015),1-14.
Menard, Randall , "First Office Action", CA Patent Application No. 2705270, Jun. 10, 2015, 1-3.
Philar, Ravi , "Non Final Office Action", CA Patent Application No. 2,593,114, Feb. 26, 2010, 1-3.
Thomas, Ciel P. , "Final Office Action", U.S. Appl. No. 12/576,977, Jul. 25, 2012, 1-25.
Thomas, Ciel P. , "Non Final Office Action", U.S. Appl. No. 12/576,977, Sep. 27, 2013, 1-13.
Thomas, Ciel P. , "Non Final Office Action", U.S. Appl. No. 12/576,977, Feb. 28, 2013, 1-20.
Thomas, Ciel P. , "Non Final Office Action", U.S. Appl. No. 12/576,977, Feb. 29, 2012, 1-26.
Thomas, Ciel P. , "Notice of Allowance", U.S. Appl. No. 12/576,977, Jan. 24, 2014, 1-13.
Unknown, "Notice of Allowance", CA Application No. 2,593,114, Jun. 7, 2010, 1-2.
Valencia, Juan C. , "Notice of Allowance", U.S. Appl. No. 13/679,696, Dec. 8, 2015, 1-7.
Wilkins III, Harry D. , "Notice of Allowance", U.S. Appl. No. 12/277,822, Sep. 15, 2011, 1-7.

* cited by examiner

PROCESS FOR RECOVERING ALKALI METALS AND SULFUR FROM ALKALI METAL SULFIDES AND POLYSULFIDES

CROSS-REFERENCE TO RELATED APPLICATIONS

This application claims the benefit of U.S. Provisional Patent Application No. 61/781,557, filed Mar. 14, 2013, which is incorporated by reference. This application is a continuation-in-part of U.S. application Ser. No. 12/576,977, filed Oct. 9, 2009, which claims the benefit of U.S. Provisional Patent Application No. 61/103,973, filed Oct. 9, 2008.

GOVERNMENT LICENSE RIGHTS

This invention was made with government support under Award No. DE-FE0000408 awarded by the United States Department of Energy. The government has certain rights in the invention.

FIELD OF THE INVENTION

The present invention relates to a process for removing nitrogen, sulfur, and heavy metals from sulfur-, nitrogen-, and metal-bearing shale oil, bitumen, heavy oil, or refinery streams. More particularly, the invention relates to a method of regenerating alkali metals from sulfides (mono- and polysulfides) of those metals. The invention further relates to the removal and recovery of sulfur from alkali metal sulfides and polysulfides.

BACKGROUND OF THE INVENTION

The demand for energy and the hydrocarbons from which that energy is derived is continually rising. The hydrocarbon raw materials used to provide this energy, however, contain difficult to remove sulfur and metals that hinder their usage. Sulfur can cause air pollution, and can poison catalysts designed to remove hydrocarbons and nitrogen oxide from motor vehicle exhaust. Similarly, other metals contained in the hydrocarbon stream can poison catalysts typically utilized for removal of sulfur through standard and improved hydro-desulfurization processes whereby hydrogen reacts under extreme conditions to break down the sulfur bearing organo-sulfur molecules.

Extensive reserves of shale oil exist in the U.S. that will increasingly play a role in meeting U.S. energy needs. Over 1 trillion barrels reserves lay in a relatively small area known as the Green River Formation located in Colorado, Utah, and Wyoming. As the price of crude oil rises, the resource becomes more attractive but technical issues remain to be solved. A key issue is addressing the relatively high level of nitrogen contained in the shale oil chemistry after retorting as well as addressing sulfur and metals content.

Shale oil characteristically is high in nitrogen, sulfur, and heavy metals which makes subsequent hydrotreating difficult. According to America's Strategic Unconventional Fuels, Vol. III—Resource and Technology Profiles, p. 111-25, nitrogen is typically around 2% and sulfur around 1% along with some metals in shale oil. Heavy metals contained in shale oil pose a large problem to upgraders. Sulfur and nitrogen typically are removed through treating with hydrogen at elevated temperature and pressure over catalysts such as Co—Mo/$Al_2O_3$ or Ni—Mo/$Al_2O_3$. These catalysts are deactivated as the metals mask the catalysts.

Another example of a source of hydrocarbon fuel where the removal of sulfur poses a problem is in bitumen existing in ample quantities in Alberta, Canada and heavy oils such as in Venezuela. In order to remove sufficient sulfur from the bitumen for it to be useful as an energy resource, excessive hydrogen must be introduced under extreme conditions, which creates an inefficient and economically undesirable process.

Over the last several years, sodium has been recognized as being effective for the treatment of high-sulfur petroleum oil distillate, crude, heavy oil, bitumen, and shale oil. Sodium is capable of reacting with the oil and its contaminants to dramatically reduce the sulfur, nitrogen, and metal content through the formation of sodium sulfide compounds (sulfide, polysulfide and hydrosulfide). Examples of the processes can be seen in U.S. Pat. Nos. 3,785,965; 3,787,315; 3,788,978; 4,076,613; 5,695,632; 5,935,421; and 6,210,564.

An alkali metal such as sodium or lithium is reacted with the oil at about 350° C. and 300-2000 psi. For example 1-2 moles sodium and 1-1.5 moles hydrogen may be needed per mole sulfur according to the following initial reaction with the alkali metal:

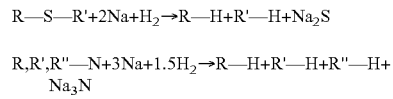

Where R, R', R" represent portions of organic molecules or organic rings.

The sodium sulfide and sodium nitride products of the foregoing reactions may be further reacted with hydrogen sulfide according to the following reactions:

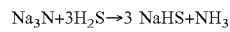

The nitrogen is removed in the form of ammonia which may be vented and recovered. The sulfur is removed in the form of an alkali hydrosulfide, NaHS, which is separated for further processing. The heavy metals and organic phase may be separated by gravimetric separation techniques. The above reactions are expressed using sodium but may be substituted with lithium.

Heavy metals contained in organometallic molecules such as complex porphyrins are reduced to the metallic state by the alkali metal. Once the heavy metals have been reduced, they can be separated from the oil because they no longer are chemically bonded to the organic structure. In addition, once the metals are removed from the porphyrin structure, the nitrogen heteroatoms in the structure are exposed for further denitrogenation.

The following is a non-limiting description of the foregoing process of using alkali metals to treat the petroleum organics. Liquid phase alkali metal is brought into contact with the organic molecules containing heteroatoms and metals in the presence of hydrogen. The free energy of reaction with sulfur and nitrogen and metals is stronger with alkali metals than with hydrogen so the reaction more readily occurs without full saturation of the organics with hydrogen. Hydrogen is needed in the reaction to fill in the where heteroatoms and metals are removed to prevent coking and polymerization, but alternatively, gases other than hydrogen may be used for preventing polymerization. Once the alkali metal compounds are formed and heavy metals are reduced to the metallic state, it is necessary to separate them. This is accomplished by a washing step, either with steam or with hydrogen sulfide to form a hydroxide phase if steam is utilized or a hydrosulfide phase if hydrogen sulfide is used. At the same time alkali nitride is presumed to react to form ammonia and more alkali hydroxide or hydrosulfide. A gravimetric separation such as centrifugation or filtering can separate the organic, upgraded oil, from the salt phase.

In conventional hydrotreating, instead of forming $Na_2S$ to desulfurize, or forming $Na_3N$ to denitrogenate, $H_2S$ and $NH_3$ are formed respectively. The reaction to form hydrogen sulfide and ammonia is much less favorable thermodynamically than the formation of the sodium or lithium compounds so the parent molecules must be destabilized to a greater degree for the desulfurization of denitrogenation reaction to proceed. According to T. Kabe, A Ishihara, W. Qian, in *Hydrodesulfurization and Hydrodenitrogenation*, pp. 37, 110-112, Wiley-VCH, 1999, this destabilization occurs after the benzo rings are mostly saturated. To provide this saturation of the rings, more hydrogen is required for the desulfurization and denitrogenation reactions and more severe conditions are required to achieve the same levels of sulfur and nitrogen removal compared to removal with sodium or lithium. As mentioned above, desulfurizing or denitrogenating using hydrogen without sodium or lithium is further complicated with the masking of catalyst surfaces from precipitating heavy metals and coke. Since the sodium is in the liquid phase, it can more easily access the sulfur, nitrogen and metals where reaction is desirable.

Once the alkali metal sulfide has been separated from the oil, sulfur and metals are substantially removed, and nitrogen is moderately removed. Also, both viscosity and density are reduced (API gravity is increased). Bitumen or heavy oil would be considered synthetic crude oil (SCO) and can be shipped via pipeline for further refining. Similarly, shale oil will have been considerably upgraded after such processing. Subsequent refining will be easier since the troublesome metals have been removed.

Although the effectiveness of the use of alkali metals such as sodium in the removal of sulfur has been demonstrated, the process is not commercially practiced because a practical, cost-effective method to regenerate the alkali metal has not yet heretofore been proposed. Several researchers have proposed the regeneration of sodium using an electrolytic cell, which uses a sodium-ion-conductive beta-alumina membrane. Beta-alumina, however, is both expensive and fragile, and no significant metal production utilizes beta-alumina as a membrane separator. Further, the cell utilizes a sulfur anode, which results in high polarization of the cell causing excessive specific energy requirements.

Metallic sodium is commercially produced almost exclusively in a Downs-cell such as the cell described in U.S. Pat. No. 1,501,756. Such cells electrolyze sodium chloride that is dissolved in a molten salt electrolyte to form molten sodium at the cathode and chlorine gas at the anode. The cells operate at a temperature near 600° C., a temperature compatible with the electrolyte used. Unlike the sulfur anode, the chlorine anode is utilized commercially both with molten salts as in the co-production of sodium and with saline solution as in the co-production of sodium hydroxide.

Another cell technology that is capable of reducing electrolyte melting range and operation of the electrolyzer to less than 200° C. has been disclosed by Jacobsen et al. in U.S. Pat. No. 6,787,019 and Thompson et al. in U.S. Pat. No. 6,368,486. In those disclosures, low temperature co-electrolyte is utilized with the alkali halide to form a low temperature melting electrolyte.

Gordon in U.S. Pat. No. 8,088,270 teaches the utilization of solvents which dissolve sulfur at a cell operating temperature and dissolving sodium polysulfide in such solvents to form an anolyte which when introduced into a cell with an alkali ion conductive membrane are electrolyzed to form sulfur at the anode and alkali metal at the cathode and where a portion of the anolyte is removed from the cell, allowed to cool until the sulfur precipitates out.

It is an object of the present invention to provide a cost-effective and efficient method for the regeneration of alkali metals used in the desulfurization, denitrogenation, and demetallation of hydrocarbon streams. As will be described herein, the present invention is able to remove contaminants and separate out unwanted material products from desulfurization/denitrogenation/demetallation reactions, and then recover those materials for later use.

Another objective of the present invention is to teach improvements in the process and device for recovering alkali metal from alkali metal sulfide generated by the sulfur removal and upgrading process.

BRIEF SUMMARY OF THE INVENTION

The present invention provides a process for removing nitrogen, sulfur, and heavy metals from sulfur-, nitrogen-, and metal-bearing shale oil, bitumen, heavy oil, or refinery streams. The present invention further provides an electrolytic process of regenerating alkali metals from sulfides, polysulfides, nitrides, and polynitrides of those metals. The present invention further provides an electrolytic process of removing sulfur from a polysulfide solution.

One non-limiting embodiment within the scope of the invention includes a process for oxidizing alkali metal sulfides and polysulfides electrochemically. The process utilizes an electrolytic cell having an alkali ion conductive membrane configured to selectively transport alkali ions, the membrane separating an anolyte compartment configured with an anode and a catholyte compartment configured with a cathode. An anolyte solution is introduced into the anolyte compartment. The anolyte solution includes an alkali metal sulfide and/or polysulfide and an anolyte solvent that partially dissolves elemental sulfur and alkali metal sulfide and polysulfide. A catholyte solution is introduced into the catholyte compartment. The catholyte solution includes alkali metal ions and a catholyte solvent. The catholyte solvent may include one of many non-aqueous solvents such as tetraethylene glycol dimethyl ether (tetraglyme), diglyme, dimethyl carbonate, dimethoxy ether, propylene carbonate, ethylene carbonate, diethyl carbonate. The catholyte may also include an alkali metal salt such as an iodide or chloride of the alkali metal. Applying an electric current to the electrolytic cell oxidizes sulfide and/or polysulfide in the anolyte compartment to form higher level polysulfide and causes high level polysulfide to oxidize to elemental sulfur. The electric current further causes alkali metal ions to pass through the alkali ion conductive membrane from the anolyte compartment to the catholyte compartment, and reduces the alkali metal ions in the catholyte compartment to form elemental alkali metal.

Sulfur may be recovered in the liquid form when the temperature exceeds the melting point of sulfur and the sulfur content of the anolyte exceeds the solubility of the solvent. Most of the anolyte solvents have lower specific gravity compared to sulfur so the liquid sulfur settles to the bottom. This settling may occur within a settling zone in the cell where the sulfur may be drained through an outlet. Alternatively a portion of the anolyte solution may be transferred to a settling zone out of the cell where settling of sulfur may occur more effectively than in a cell.

The melting temperature of sulfur is near 115° C. so the cell is best operated above that temperature, above 120° C. At that temperature or above, the alkali metal is also molten if the alkali metal is sodium. Operation near a higher temperature, such as in the 125-150° C. range, allows the sulfur to fully remain in solution as it is formed from the polysulfide at the anode, then when the anolyte flows to a settling zone, within or external to the cell where the temperature may be 5-20° C. cooler, the declining solubility of the sulfur in the solvent results in a sulfur liquid phase forming which is has higher specific gravity and settles from the anolyte. Then when the anolyte flows back toward the anodes where sulfur is forming through electrochemical oxidation of polysulfide, the anolyte has solubility has the capacity to dissolve the sulfur as it is formed, preventing fouling and polarization at the anodes or at membrane surfaces.

In one non-limiting embodiment within the scope of the invention, a cell for electrolyzing an alkali metal sulfide or polysulfide is provided where the cell operates at a temperature above the melting temperature of the alkali metal and where the cathode is wholly or partially immersed in a bath of the molten alkali metal with a divider between an anolyte compartment and a catholyte compartment. In this case the catholyte essentially comprises molten alkali metal but may also include solvent and alkali metal salt. The divider may be permeable to alkali metal cations and substantially impermeable to anions, solvent and dissolved sulfur. The divider comprises in part an alkali metal conductive ceramic or glass ceramic. The divider may be conductive to alkali ions which include lithium and sodium.

In another non-limiting embodiment, a cell for electrolyzing an alkali metal polysulfide is provided with an anolyte compartment and a catholyte compartment where the anolyte solution comprises a polar solvent and dissolved alkali metal polysulfide. The anolyte solution comprises a solvent that dissolves to some extent elemental sulfur. The anolyte may comprise a solvent where one or more of the solvents includes: N,N-dimethylaniline, quinoline, tetrahydrofuran, 2-methyl tetrahydrofuran, benzene, cyclohexane, fluorobenzene, thrifluorobenzene, toluene, xylene, tetraethylene glycol dimethyl ether (tetraglyme), diglyme, isopropanol, ethyl propional, dimethyl carbonate, dimethoxy ether, dimethylpropyleneurea, formamide, methyl formamide, dimethyl formamide, acetamide, methyl acetamide, dimethyl acetamide, triethylamine, diethyl acetamide, ethanol and ethyl acetate, propylene carbonate, ethylene carbonate, and diethyl carbonate.

In one non-limiting embodiment, a method for oxidizing sulfides and polysulfides electrochemically from an anolyte solution at an anode is disclosed where the anolyte solution comprises in part an anolyte solvent that dissolves to some extent elemental sulfur. In the method, the anolyte solvent that dissolves to some extent elemental sulfur is one or more of the following: N,N-dimethylaniline, quinoline, tetrahydrofuran, 2-methyl tetrahydrofuran, benzene, cyclohexane, fluorobenzene, thrifluorobenzene, toluene, xylene, tetraethylene glycol dimethyl ether (tetraglyme), diglyme, isopropanol, ethyl propional, dimethyl carbonate, dimethoxy ether, dimethylpropyleneurea, formamide, methyl formamide, dimethyl formamide, acetamide, methyl acetamide, dimethyl acetamide, triethylamine, diethyl acetamide, ethanol and ethyl acetate, propylene carbonate, ethylene carbonate, and diethyl carbonate.

In another non-limiting embodiment, a cell for electrolyzing an alkali metal monosulfide or a polysulfide is provided with an anolyte compartment and a catholyte compartment where the anolyte solution comprises a polar solvent and dissolved alkali metal monosulfide or a polysulfide. The anolyte solution comprises a solvent that dissolves to some extent elemental sulfur. The anolyte may comprise a solvent where one or more of the solvents includes: N,N-dimethylaniline, quinoline, tetrahydrofuran, 2-methyl tetrahydrofuran, benzene, cyclohexane, fluorobenzene, thrifluorobenzene, toluene, xylene, tetraethylene glycol dimethyl ether (tetraglyme), diglyme, isopropanol, ethyl propional, dimethyl carbonate, dimethoxy ether, dimethylpropyleneurea, formamide, methyl formamide, dimethyl formamide, acetamide, methyl acetamide, dimethyl acetamide, triethylamine, diethyl acetamide, ethanol and ethyl acetate, propylene carbonate, ethylene carbonate, and diethyl carbonate.

In one non-limiting embodiment, a method for oxidizing monosulfide or polysulfides electrochemically from an anolyte solution at an anode is disclosed where the anolyte solution comprises in part an anolyte solvent that dissolves to some extent elemental sulfur. In the method, the anolyte solvent that dissolves to some extent elemental sulfur is one or more of the following: N,N-dimethylaniline, quinoline, tetrahydrofuran, 2-methyl tetrahydrofuran, benzene, cyclohexane, fluorobenzene, thrifluorobenzene, toluene, xylene, tetraethylene glycol dimethyl ether (tetraglyme), diglyme, isopropanol, ethyl propional, dimethyl carbonate, dimethoxy ether, dimethylpropyleneurea, formamide, methyl formamide, dimethyl formamide, acetamide, methyl acetamide, dimethyl acetamide, triethylamine, diethyl acetamide, ethanol and ethyl acetate, propylene carbonate, ethylene carbonate, and diethyl carbonate.

In one non-limiting embodiment, the anolyte solvent comprises from about 60-100 vol. % polar solvent and 0-40 vol. % apolar solvent. A blend of different anolyte solvents may help optimize the solubility of elemental sulfur and the solubility of sulfide and polysulfide.

Another non-limiting embodiment discloses a method for removal of dissolved elemental sulfur from a solvent/alkali metal polysulfide mixture includes cooling, reducing the solubility of sulfur in the solvent and causing a second liquid phase to form comprising elemental sulfur, and then separating the liquid phase sulfur from the liquid phase solvent mixture. The separation of liquid phase sulfur from liquid phase anolyte includes one or more of the following: gravimetric, centrifugation. The alkali metal polysulfide is of the class including sodium polysulfide and lithium polysulfide.

The present invention may provide certain advantages, including but not limited to the following:

Removing an alkali metal continuously or semi-continuously in liquid form from the cell.

Removing sulfur continuously or semi-continuously in liquid form from the cell.

Removing high alkali metal polysulfides and dissolved sulfur continuously or semi-continuously from the electrolytic cell, thereby reducing polarization of the anode by sulfur.

Separating sulfur continuously or semi-continuously from a stream containing a mixture of solvent, sulfur, and alkali metal polysulfides such that the solvent and alkali metal polysulfides are substantially recovered such that they can be returned back to an electrolytic process.

Operating the electrolytic cells at temperatures and pressures, so that the electrolytic cell materials of construction can include materials which would not tolerate high elevated temperature.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment, but may refer to every embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the methods and cells of the present invention, as represented in FIGS. 1 through 4, is not intended to limit the scope of the invention, as claimed, but is merely representative of present embodiments of the invention.

Figure 1:
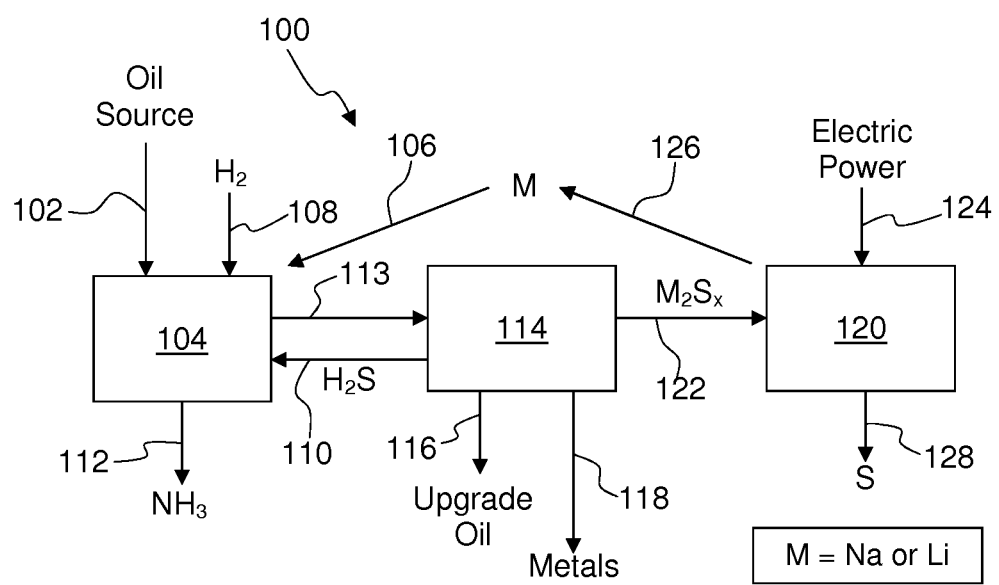
FIG. 1 shows an overall process for removing nitrogen, sulfur, and heavy metals from sulfur-, nitrogen-, and metal-bearing oil sources using an alkali metal and for regenerating the alkali metal.

The overall process is shown schematically in FIG. 1 of one non-limiting embodiment for removing nitrogen, sulfur, and heavy metals from sulfur-, nitrogen-, and metal-bearing oil sources using an alkali metal and for regenerating the alkali metal. In the process 100 of FIG. 1, an oil source 102, such as high-sulfur petroleum oil distillate, crude, heavy oil, bitumen, or shale oil, is introduced into a reaction vessel 104. An alkali metal (M) 106, such as sodium or lithium, is also introduced into the reaction vessel, together with a quantity of hydrogen 108. The alkali metal and hydrogen react with the oil and its contaminants to dramatically reduce the sulfur, nitrogen, and metal content through the formation of sodium sulfide compounds (sulfide, polysulfide and hydrosulfide) and sodium nitride compounds. Examples of the processes are known in the art, including but not limited to, U.S. Pat. Nos. 3,785,965; 3,787,315; 3,788,978; 4,076,613; 5,695,632; 5,935,421; and 6,210,564.

The alkali metal (M) and hydrogen react with the oil at about 350° C. and 300-2000 psi according to the following initial reactions:

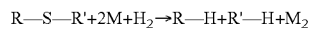

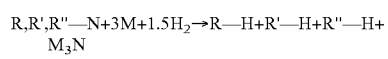

Where R, R', R" represent portions of organic molecules or organic rings.

The sodium sulfide and sodium nitride products of the foregoing reactions may be further reacted with hydrogen sulfide 110 according to the following reactions:

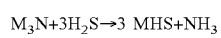

The nitrogen is removed in the form of ammonia 112, which may be vented and recovered. The sulfur is removed from the oil source in the form of an alkali hydrosulfide (MHS), such as sodium hydrosulfide (NaHS) or lithium hydrosulfide (LiHS). The reaction products 113, are transferred to a separation vessel 114. Within the separation vessel 114, the heavy metals 118 and upgraded oil organic phase 116 may be separated by gravimetric separation techniques.

The alkali hydrosulfide (MHS) is separated for further processing. The alkali hydrosulfide stream may be the primary source of alkali metal and sulfur from the process of the present invention. When the alkali hydrosulfide is reacted with a medium to high polysulfide (i.e. $M_2S_x$; 4≤x≤6) then hydrogen sulfide will be released and the resulting mixture will have additional alkali metal and sulfide content where the sulfur to alkali metal ratio is lower. The hydrogen sulfide 110 can be used in the washing step upstream where alkali sulfide and alkali nitride and metals need to be removed from the initially treated oil.

Figure 2A:
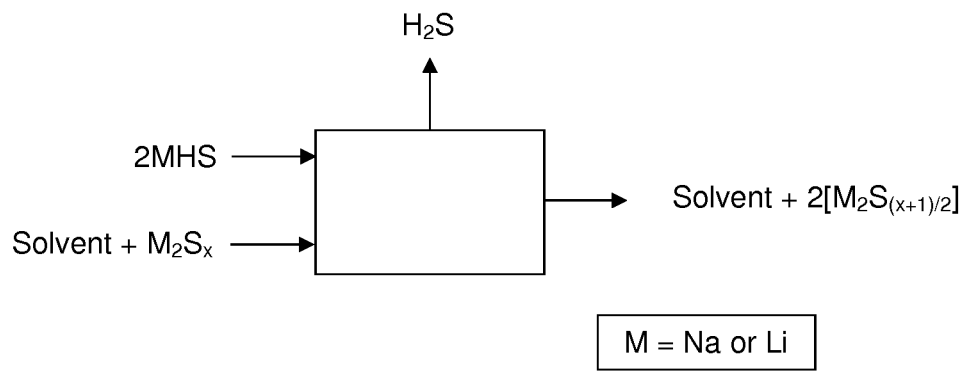
FIGS. 2A and 2B show schematic processes for converting alkali metal hydrosulfide to alkali metal polysulfide and recovering hydrogen sulfide.

A schematic representation of this process is shown in FIG. 2A. For example, in the case of sodium the following reaction may occur:

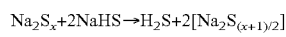

Where x:y represent the average ratio of sodium to sulfur atoms in the solution. In the process shown in FIG. 2A, an alkali polysulfide with high sulfur content is converted to an alkali polysulfide with a lower sulfur content.

Figure 2B:
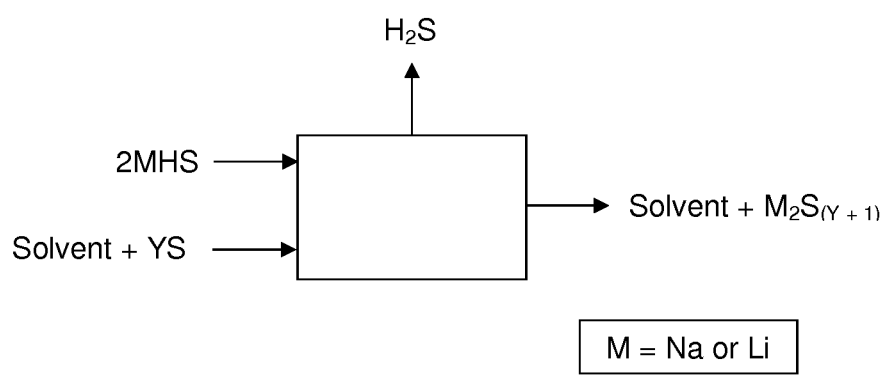

Alternatively, rather than reacting the alkali metal hydrosulfide with an alkali metal polysulfide, the alkali metal hydrosulfide can be reacted with sulfur. A schematic representation of this process is shown in FIG. 2B. For example, in the case of sodium the following reaction may occur:

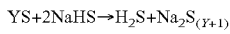

$$YS + 2NaHS \rightarrow H_2S + Na_2S_{(Y+1)}$$

Where Y is a molar amount of sulfur added to the sodium hydrosulfide.

The alkali metal polysulfide may be further processed in an electrolytic cell to remove and recover sulfur and to remove and recover the alkali metal. One electrolytic cell 120 is shown in FIG. 1. The electrolytic cell 120 receives alkali polysulfide 122. Under the influence of a source electric power 124, alkali metal ions are reduced to form the alkali metal (M) 126, which may be recovered and used as a source of alkali metal 106. Sulfur 128 is also recovered from the process of the electrolytic cell 120. A detailed discussion of one possible electrolytic cell that may be used in the process within the scope of the present invention is given with respect to FIG. 3. A more detailed discussion relating to the recovery of sulfur 128 is given with respect to FIG. 4, below.

Figure 4:
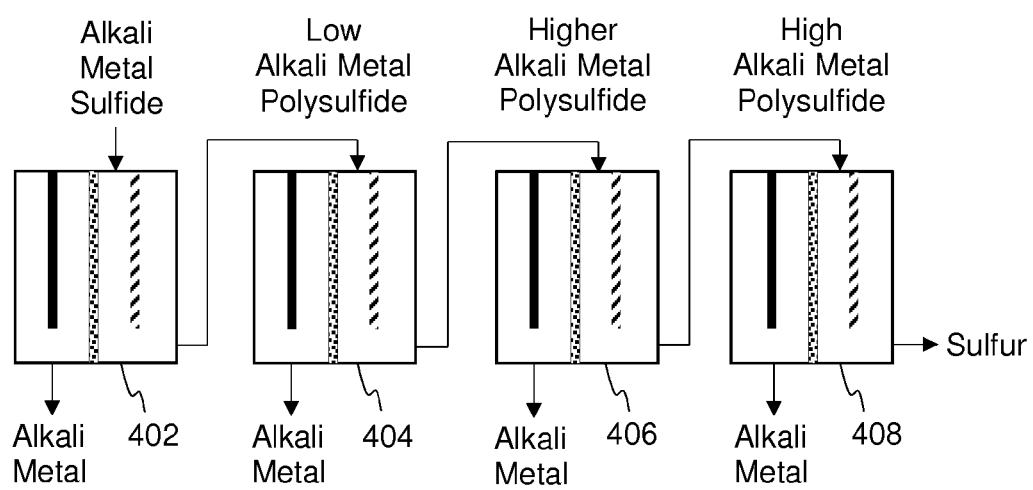
FIG. 4 shows a schematic of several electrolytic cells operated in series to extract alkali metal and oxidize alkali metal sulfide to polysulfide and low polysulfide to high polysulfide and high polysulfide to sulfur.

The vessel where the reaction depicted in FIGS. 2A and 2B occurs could be the anolyte compartment of the electrolytic cell 120 depicted in FIG. 1, the thickener 312 depicted in FIG. 4, or in a separate vessel conducive to capturing and recovering the hydrogen sulfide gas 110 generated. Alternatively, sulfur generated in the process depicted in FIG. 1 could be used as an input as depicted in FIG. 2B.

Figure 3:
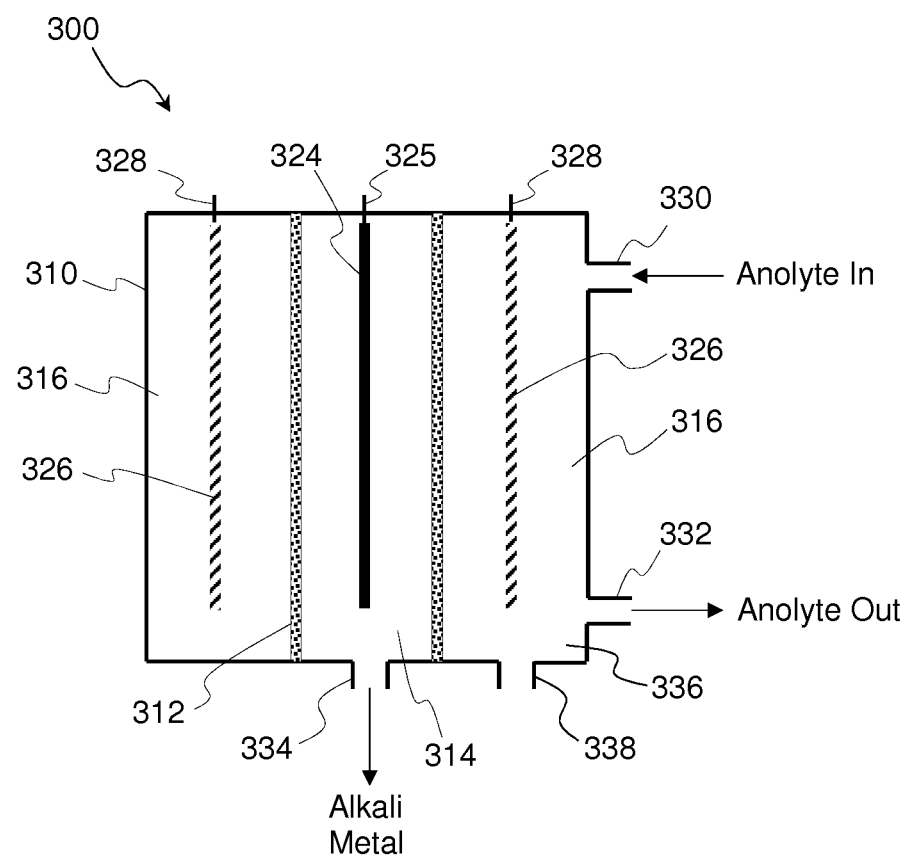
FIG. 3 shows a schematic cross-section of an electrolytic cell which utilizes many of the features within the scope of the invention.

FIG. 3 shows a schematic sectional view of an electrolytic cell 300 which utilizes many of the features within the scope of the invention. The cell is comprised of a housing 310, which typically is an electrical insulator and which is chemically resistant to solvents and sodium sulfide. A cation conductive membrane 312, in this case in the form of a tube, divides the catholyte compartment 314 from the anolyte compartment 316. Within the catholyte compartment is a cathode 324. The cathode 324 may be configured to penetrate the housing 310 or have a lead 325 that penetrates the housing 310 so that a connection may be made to negative pole of a DC electrical power supply (not shown). Within the anolyte compartment 316 is an anode 326 which in this case is shown as a porous mesh type electrode in a cylindrical form which encircles the membrane tube 312. A lead 328 penetrates the housing so that a connection may be made with a positive pole of the DC power supply. An anolyte solution flows through an anolyte inlet 330. The anolyte is comprised of a mixture of solvents and alkali metal sulfides. As anolyte flows in through the inlet 330 anolyte also flows out of the outlet 332. In some cases a second liquid phase of molten sulfur may also exit with the anolyte. A second outlet may be provided from the anolyte compartment at a location lower than the anolyte outlet 332. The second, lower outlet may be used more for removal of molten sulfur that has settled and accumulated at the cell bottom. The space between the cathode 324 and the membrane 312 is generally filled with molten alkali metal. As the cell operates, alkali metal ions pass through the membrane 312 and reduce at the cathode 324 to form alkali metal in the catholyte compartment 314 resulting in a flow of alkali metal through the catholyte outlet 334.

A cell may have multiple anodes, cathodes, and membranes. Within a cell the anodes all would be in parallel and the cathodes all in parallel.

Referring to FIG. 3, electrolytic cell housing 310 is preferably an electrically insulative material such as most polymers. The material also is preferably chemically resistant to solvents. Polytetrafluoroethylene (PTFE) is particularly suitable, as well as Kynar® polyvinylidene fluoride, or high density polyethylene (HDPE). The cell housing 310 may also be fabricated from a non insulative material and non-chemically resistant materials, provided the interior of the housing 310 is lined with such an insulative and chemically resistant material. Other suitable materials would be inorganic materials such as alumina, silica, alumino-silicate and other insulative refractory or ceramic materials.

The cation conductive membrane 312 preferably is substantially permeable only to cations and substantially impermeable to anions, polyanions, and dissolved sulfur. The membrane 312 may be fabricated in part from an alkali metal ion conductive material. If the metal to be recovered by the cell is sodium, a particularly well suited material for the divider is known as NaSICON which has relatively high ionic conductivity at room temperature. A typical NaSICON composition substantially would be $Na_{1+x}Zr_2Si_xP_{3-x}O_{12}$ where $0<x<3$. Other NaSICON compositions are known in the art. Alternatively, if the metal to be recovered in the cell is lithium, then a particularly well suited material for the divider would be lithium titanium phosphate (LTP) with a composition that is substantially, $Li_{(1+x+4y)}Al_xTi_{(1-x-y)}(PO_4)_3$ where $0<x<0.4$, $0<y<0.2$. Other suitable materials may be from the ionically conductive glass and glass ceramic families such as the general composition $Li_{1+x}Al_xGe_{2-x}PO_4$. Other lithium conductive materials are known in the art. The membrane 312 may have a portion of its thickness which has negligible through porosity such that liquids in the anolyte compartment 316 and catholyte compartment 314 cannot pass from one compartment to the other but substantially only alkali ions (M⁺), such as sodium ions or lithium ions, can pass from the anolyte compartment 316 to the catholyte compartment 314. The membrane may also be comprised in part by an alkali metal conductive glass-ceramic such as the materials produced by Ohara Glass of Japan.

The anode 326 is located within the anolyte compartment 316. It may be fabricated from an electrically conductive material such as stainless steel, nickel, iron, iron alloys, nickel alloys, and other anode materials known in the art. The anode 326 is connected to the positive terminal of a direct current power supply. The anode 326 may be a mesh, monolithic structure or may be a monolith with features to allow passage of anolyte through the anode structure. Anolyte solution is fed into the anolyte compartment through an inlet 330 and passes out of the compartment through and outlet 332. The electrolytic cell 300 can also be operated in a semi-continuous fashion where the anolyte compartment is fed and partially drained through the same passage.

The electronically conductive cathode 324 is in the form of a strip, band, rod, or mesh. The cathode 324 may be comprised of most electronic conductors such as steel, iron, copper, or graphite. A portion of the cathode may be disposed within the catholyte compartment 314 and a portion outside the catholyte compartment 314 and cell housing 310 for electrical contact. Alternatively, a lead 325 may extend from the cathode outside the cell housing 310 for electrical contact.

Within the catholyte compartment 314 is an alkali ion conductive liquid which may include a polar solvent. Non-limiting examples of suitable polar solvents are as tetraethylene glycol dimethyl ether (tetraglyme), diglyme, dimethyl carbonate, dimethoxy ether, propylene carbonate, ethylene carbonate, diethyl carbonate and such. An appropriate alkali metal salt, such as a chloride, bromide, iodide, perchlorate, hexafluorophosphate or such, is dissolved in the polar solvent to form that catholyte solution. Most often the catholyte is a bath of molten alkali metal.

One non-limiting example of the operation of the electrolytic cell 300 is described as follows: Anolyte solution is fed into the anolyte compartment 316. The electrodes 324, 326 are energized such that there is an electrical potential between the anode 326 and the cathode 324 that is greater than the decomposition voltage which ranges between about 1.8V and about 2.5V depending on the composition. Concurrently, alkali metal ions, such as sodium ions, pass through the membrane 312 into the catholyte compartment 314, sodium ions are reduced to the metallic state within the catholyte compartment 314 with electrons supplied through the cathode 324, and sulfide and polysulfide is oxidized at the anode 326 such that low polysulfide anions become high polysulfide anions and/or elemental sulfur forms at the anode. While sulfur is formed it is dissolved into the anolyte solvent in entirety or in part. On sulfur saturation or upon cooling, sulfur may form a second liquid phase of that settles to the bottom of the anolyte compartment 316 of the electrolytic cell. The sulfur may be removed with the anolyte solution to settle in a vessel outside of the cell or it may be directly removed from a settling zone 336 via an optional sulfur outlet 338, as shown in FIG. 3.

A mode of operation may be to have the anolyte of one electrolytic cell flow into a second cell and from a second cell into a third cell, and so forth where in each successive cell the ratio of sodium to sulfide decreases as the polysulfide forms become of higher order. FIG. 4 is non-limiting schematic of four electrolytic cells, 402, 404, 406, 408 operated in series to extract alkali metal and oxidize alkali metal sulfide to low alkali metal polysulfide, to oxidize low alkali metal polysulfide to higher alkali metal polysulfide, and to oxidize higher alkali metal polysulfide to high alkali metal polysulfide, and to oxidize high alkali metal polysulfide to sulfur. The electrolytic cells 402, 404, 406, and 408 may be operated such that only in the final cell is sulfur produced but where alkali metal is produced at the cathode of all of them.

In a non-limiting example, an alkali metal monosulfide, such as sodium sulfide ($Na_2S$) may be introduced into the first electrolytic cell 402. Under the influence of a DC power supply, sodium ions are transported from the anolyte compartment to the catholyte compartment where the alkali ions are reduced to form alkali metal. Sulfide is oxidized in the anolyte compartment to form a low polysulfide, such as $Na_2S_4$. The low alkali metal polysulfide is transported to the anolyte compartment of a second electrolytic cell 404. Under the influence of a DC power supply, sodium ions are transported from the anolyte compartment to the catholyte compartment where the alkali ions are reduced to form alkali metal. The low polysulfide is oxidized in the anolyte compartment to form a higher polysulfide, such as $Na_2S_6$. The higher alkali metal polysulfide is transported to the anolyte compartment of a third electrolytic cell 406. Under the influence of a DC power supply, sodium ions are transported from the anolyte compartment to the catholyte compartment where the alkali ions are reduced to form alkali metal. The higher polysulfide is oxidized in the anolyte compartment to form a high polysulfide, such as $Na_2S_8$. The high alkali metal polysulfide is transported to the anolyte compartment of a fourth electrolytic cell 408. Under the influence of a DC power supply, sodium ions are transported from the anolyte compartment to the catholyte compartment where the alkali ions are reduced to form alkali metal. High polysulfide is oxidized in the anolyte compartment to form sulfur, which is subsequently removed from the anolyte compartment and recovered.

It will be understood that the foregoing examples of different polysulfides are given as representative examples of the underlying principle that that higher order polysulfides may be formed by and the combination of oxidizing the polysulfide and removing sodium ions.

The multi-cell embodiment described in relation to FIG. 4 enables alkali metal and sulfur to be formed more energy efficiently compared to a single cell embodiment. The reason for the energy efficiency is because it requires less energy to oxidize lower polysulfides compared to higher polysulfides. The voltage required to oxidize polysulfides to sulfur is about 2.2 volts, whereas monosulfide and low polysulfide may be oxidized at a lower voltage, such as 1.7 volts.

In the case of the alkali metal being sodium, the following typical reactions may occur in the electrolytic cell 300:

At the Cathode:

$$Na^+ + e^- \rightarrow Na$$

At the Anode:

$$Na_2S_x \rightarrow Na^+ + e^- + \tfrac{1}{2} Na_2S_{(2x)} \qquad 1)$$

$$Na_2S_x \rightarrow Na^+ + e^- + \tfrac{1}{2} Na_2S_x + x/16\ S_8 \qquad 2)$$

Where x ranges from 0 to about 8.

Most sodium is produced commercially from electrolysis of sodium chloride in molten salt rather than sodium polysulfide, but the decomposition voltage and energy requirement is about half for polysulfide compared to chloride as shown in Table 1.

TABLE 1

| Decomposition voltage and energy (watt-hour/mole) of sodium and lithium chlorides and sulfides | | | | |
|---|---|---|---|---|
|  | NaCl | $Na_2S$ | LiCl | $Li_2S$ |
| V | 4.0 | <2.1 | 4.2 | 2.3 |
| Wh/mole | 107 | <56 | 114 | 60 |

The open circuit potential of a sodium/polysulfide cell is as low as 1.8V when a lower polysulfide, $Na_2S_3$ is decomposed, while the voltage rises with rising sulfur content. Thus, it may be desirable to operate a portion of the electrolysis using anolyte with lower sulfur content. In one embodiment, a planar NaSICON or Lithium Titanium Phosphate (LTP) membrane is used to regenerate sodium or lithium, respectively. NaSICON and LTP have good low temperature conductivity as shown in Table 2. The conductivity values for beta alumina were estimated from the 300° C. conductivity and activation energy reported by May. G. May, *J. Power Sources*, 3, 1 (1978).

TABLE 2

| Conductivities of NaSICON, LTP, Beta alumina at 25° C., 120° C. | | | |
|---|---|---|---|
|  | Conductivity mS/cm | | |
| Temperature ° C. | NaSICON | LTP | Beta alumina (est) |
| 25 | 0.9 | 0.9 | 0.7 |
| 120 | 6.2 | 1.5 | 7.9 |

It may be beneficial to operate 2 or more sets of cells, a non-limiting example of which is shown in FIG. 4. Some cells would operate with lower order sulfide and polysulfides in the anolyte while another set of cells operate with higher order polysulfide. In the latter, free sulfur would become a product requiring removal.

The following example is provided below which discusses one specific embodiment within the scope of the invention. This embodiment is exemplary in nature and should not be construed to limit the scope of the invention in any way.

An electrolytic flow cell utilizes a 1" diameter NaSICON membrane with approximately 3.2 cm$^2$ active area. The NaSICON is sealed to a scaffold comprised of a non-conductive material that is also tolerant of the environment. One suitable scaffold material is alumina. Glass may be used as the seal material. The flow path of electrolytes will be through a gap between electrodes and the membrane. The anode (sulfur electrode) may be comprised of aluminum. The cathode may be either aluminum or stainless steel. It is within the scope of the invention to configure the flow cell with a bipolar electrodes design. Anolyte and catholyte solutions will each have a reservoir and pump. The anolyte reservoir will have an agitator. The entire system will preferably have temperature control with a maximum temperature of 150° C. and also be configured to be bathed in a dry cover gas. The system preferably will also have a power supply capable of delivering to 5 VDC and up to 100 mA/cm$^2$.

As much as possible, materials will be selected for construction that are corrosion resistant with the expected conditions. The flow cell will be designed such that the gap between electrodes and membrane can be varied.

In view of the foregoing, it will be appreciated that the disclosed invention includes one or more of the following advantages:

Removing an alkali metal continuously or semi-continuously in liquid form from the cell.

Removing sulfur continuously or semi-continuously in liquid form from the cell.

Removing high alkali metal polysulfides and dissolved sulfur continuously or semi-continuously from the electrolytic cell, thereby reducing polarization of the anode by sulfur.

Separating sulfur continuously or semi-continuously from a stream containing a mixture of solvent, sulfur, and alkali metal polysulfides such that the solvent and alkali metal polysulfides are substantially recovered such that they can be returned back to an electrolytic process.

Operating the electrolytic cells at temperatures and pressures, so that the electrolytic cell materials of construction can include materials which would not tolerate high elevated temperature.

While specific embodiments of the present invention have been illustrated and described, numerous modifications come to mind without significantly departing from the spirit of the invention, and the scope of protection is only limited by the scope of the accompanying claims.

The invention claimed is:

1. An electrolytic cell for oxidizing an alkali metal monosulfide or alkali metal polysulfides comprising:
    an anolyte compartment configured with an anode and containing an anolyte solution comprising an alkali metal monosulfide, an alkali metal polysulfide, or a mixture thereof and an anolyte solvent that partially dissolves elemental sulfur, the anolyte compartment further comprising an anolyte solution inlet and an anolyte solution outlet;
    a catholyte compartment configured with a cathode and containing a catholyte, wherein the catholyte comprises a molten alkali metal, the catholyte compartment further comprising a catholyte outlet;
    an alkali ion conductive membrane configured to selectively transport alkali ions, wherein the alkali ion conductive membrane is substantially impermeable to anions, the anolyte solvent, and dissolved sulfur;
    a source of electric potential electrically coupled to the anode and the cathode and configured to:
        oxidize the alkali metal monosulfide or polysulfide in the anolyte compartment to form liquid elemental sulfur and alkali metal ions;
        cause the alkali metal ions to pass through the alkali ion conductive membrane from the anolyte compartment to the catholyte compartment; and
        reduce the alkali metal ions in the catholyte compartment to form liquid elemental alkali metal;
    an elemental sulfur settling zone where the liquid elemental sulfur forms a second liquid phase and separates from the anolyte solution; and
    a sulfur outlet for removal of the liquid elemental sulfur from the electrolytic cell disposed at a location lower than the anolyte solution outlet.

2. The electrolytic cell according to claim 1, wherein the alkali ion conductive membrane comprises in part an alkali metal conductive ceramic or glass ceramic.

3. The electrolytic cell according to claim 1, wherein the alkali ion conductive membrane comprises a solid MSICON (Metal Super Ion CONducting) material, where M is Na or Li.

4. The electrolytic cell according to claim 1, wherein the anolyte solvent comprises one or more solvents selected from N,N-dimethylaniline, quinoline, tetrahydrofuran, 2-methyl tetrahydrofuran, benzene, cyclohexane, fluorobenzene, thrifluorobenzene, toluene, xylene, tetraethylene glycol dimethyl ether (tetraglyme), diglyme, isopropanol, ethyl propional, dimethyl carbonate, dimethoxy ether, dimethylpropyleneurea, formamide, methyl formamide, dimethyl formamide, acetamide, methyl acetamide, dimethyl acetamide, triethylamine, diethyl acetamide, ethanol and ethyl acetate, propylene carbonate, ethylene carbonate, and diethyl carbonate.

5. The electrolytic cell according to claim 1, wherein the anolyte solvent comprises from about 60-100 vol. % polar solvent and 0-40 vol. % apolar solvent.

6. A plurality of coupled electrolytic cells comprising a first electrolytic cell according to claim 1 and a second electrolytic cell according to claim 1, wherein the anolyte solution inlet of the second electrolytic cell is connected to the anolyte solution outlet of the first electrolytic cell.

7. A plurality of coupled electrolytic cells comprising a first electrolytic cell according to claim 1, a second electrolytic cell according to claim 1, a third electrolytic cell according to claim 1, and a fourth electrolytic cell according to claim 1, wherein the anolyte solution inlet of the fourth electrolytic cell is connected to the anolyte solution outlet of the third electrolytic cell, wherein the anolyte solution inlet of the third electrolytic cell is connected to the anolyte solution outlet of the second electrolytic cell, and wherein the anolyte solution inlet of the second electrolytic cell is connected to the anolyte solution outlet of the first electrolytic cell.

* * * * *